SIGNAL AMPLIFIER SYSTEM

Filed May 28, 1957 2 Sheets-Sheet 1

INVENTOR.
MAX H. DIEHL
BY George V. Eltgroth
ATTORNEY.

March 22, 1960 M. H. DIEHL 2,929,998

SIGNAL AMPLIFIER SYSTEM

Filed May 28, 1957 2 Sheets-Sheet 2

INVENTOR.
MAX H. DIEHL
BY
George V. Eltgroth
ATTORNEY

United States Patent Office 2,929,998

Patented Mar. 22, 1960

2,929,998

SIGNAL AMPLIFIER SYSTEM

Max H. Diehl, Syracuse, N.Y., assignor to General Electric Company, a corporation of New York Application May 28, 1957, Serial No. 662,093

20 Claims. (Cl. 330—22)

Figure 1:
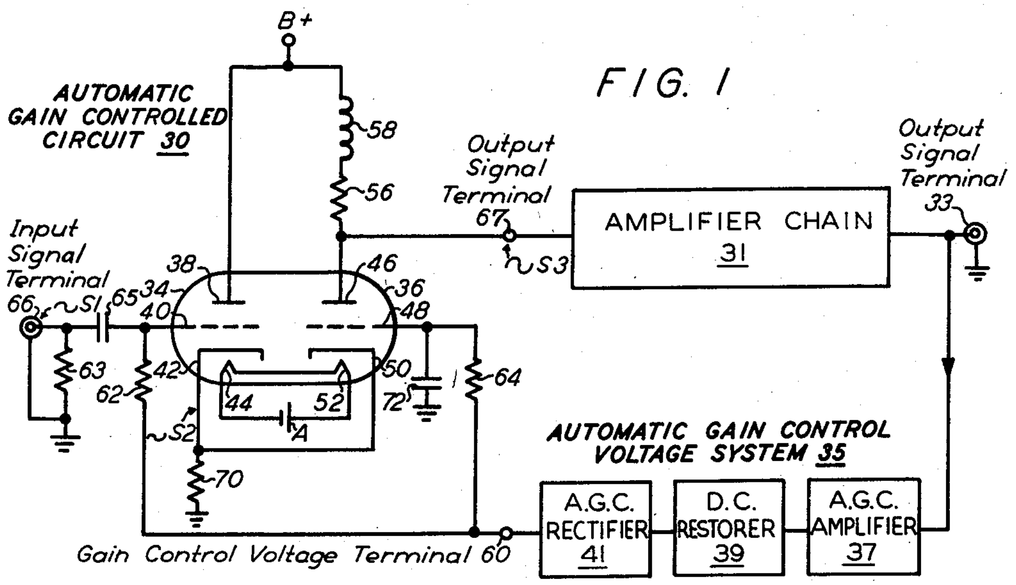

This invention relates to signal amplifier systems and more particularly to signal amplifier systems which employ automatic gain (volume) control.

The purpose of providing automatic gain control in a signal amplifier system is to prevent relatively large changes in the amplitude or level of the output signal due to relatively large changes in the level of the input signal. This is generally accomplished by providing a circuit arrangement which adjusts the gain of the amplifier system in a specified manner in response to changes in the level of the input signal.

A signal amplifier system with automatic gain control generally comprises an amplifier system which includes an automatic gain controlled amplifier circuit and a system for producing the automatic gain control signal. Signal distortion is particularly troublesome in automatic gain controlled amplifier circuits. This is especially true in amplifier systems for use in television broadcasting service, especially in a case when a film is the source of the video signals, since the video signal variations are very large and sometimes very rapid. If the amplifier system is to be used in conjunction with color television broadcasting, the distortion problems are multiplied. Distortion in the broadcasted television signal results in a reduction in the quality of the picture received by the television viewer.

Corresponding distortion problems exist in audio amplifying systems used in radio and television broadcasting and in other applications such as high fidelity audio systems.

Therefore, an object of this invention is to provide an improved amplifier system which employs automatic gain control.

Another object of this invention is to provide an improved amplifier system which introduces substantially no amplitude distortion because of an automatic gain control feature.

A more specific object of the invention is to provide an improved automatic gain controlled amplifier system for amplifying video signals including color television signals with a minimum amount of amplitude distortion.

Briefly, the invention is embodied in an amplifier system which comprises an amplifier chain, an automatic gain control voltage system, and an automatic gain controlled circuit. In accordance with an embodiment of the invention employing vacuum tube techniques, the automatic gain controlled circuit comprises two cathode coupled triode sections. The incoming signal is applied to the grid of the first triode section and the output signal is taken from the anode of the second triode section. The gain control voltage produced by the automatic gain control voltage system in response to variations in the amplitude of the output signal is applied to the grids of each of the triode sections. This voltage automatically controls the gain of each triode section. There is substantially no distortion because in response to the incoming signal the anode currents in the triode sections move in opposite directions. This has the effect of cancelling the curvature of the grid-voltage anode current characteristic of one triode section with the opposite curvature of the other irrespective of the gain of the amplifier system. Therefore, substantially no distortion is introduced into the system by the automatic gain controlled circuit so that the amplifier system produces an output signal with substantially no distortion.

Briefly, the invention is also embodied in an amplifier system employing transistor techniques which comprises an amplifier chain, an automatic gain control voltage system, and an automatic gain controlled circuit comprising two emitter-coupled three-electrode transistors which operate in a manner similar to that described with respect to the system employing vacuum tube techniques. Thus, there is substantially no distortion because in response to the incoming signal, the collector currents move in opposite directions which has the effect of cancelling the curvature of the base-to-emitter voltage-collector current transfer characteristic of one transistor with the opposite curvature of the other.

Figures 2, 3, 3A, 4:
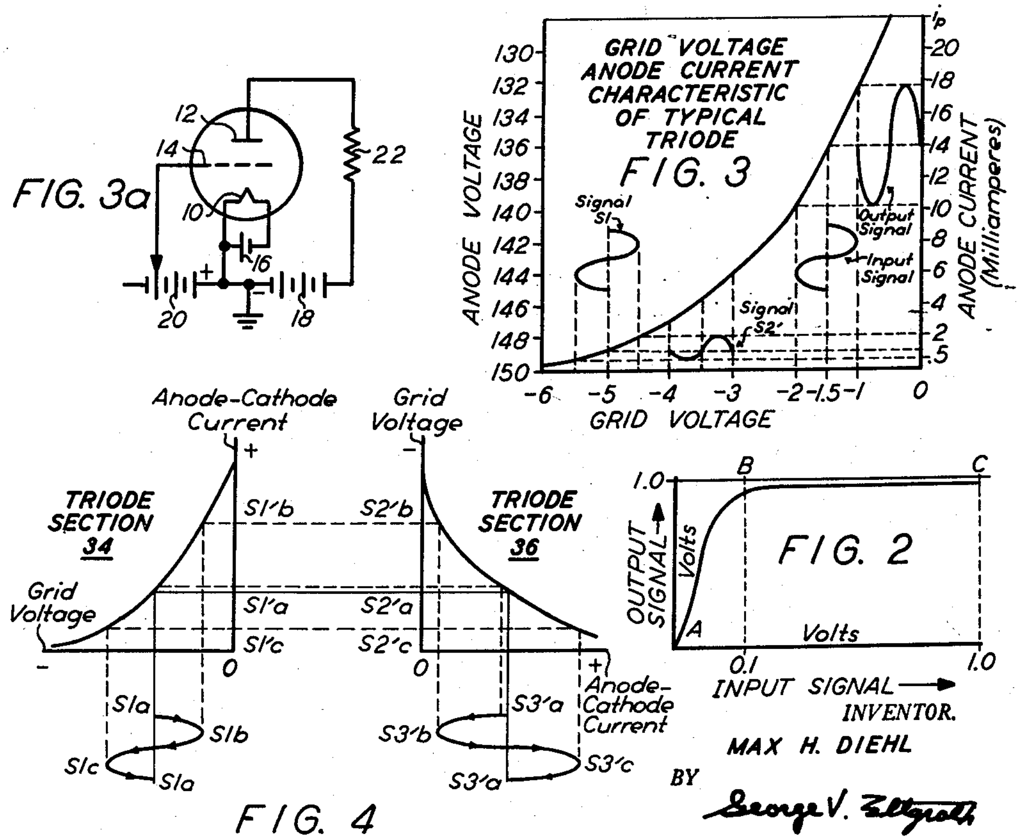
Figure 5:
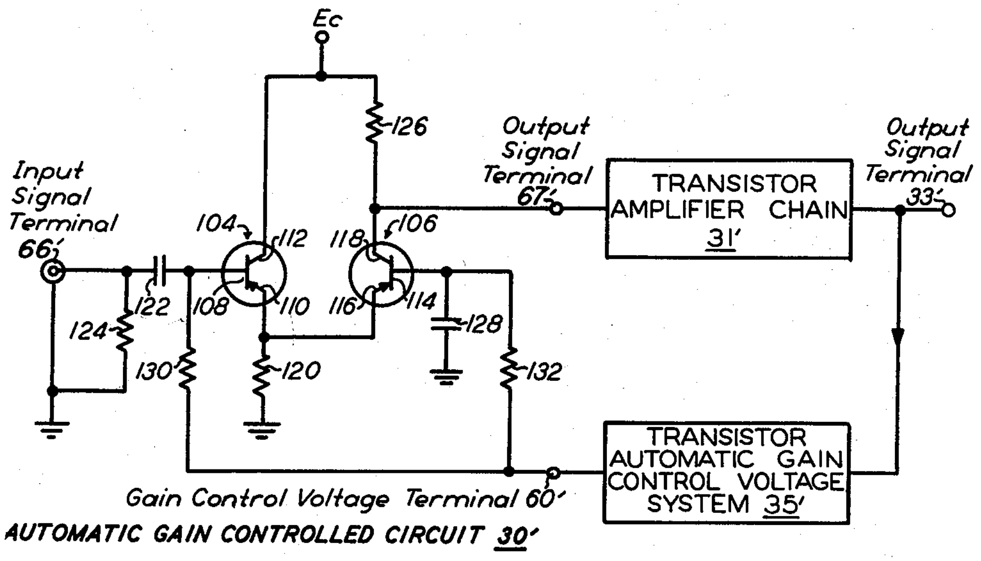
Figures 6, 6A:
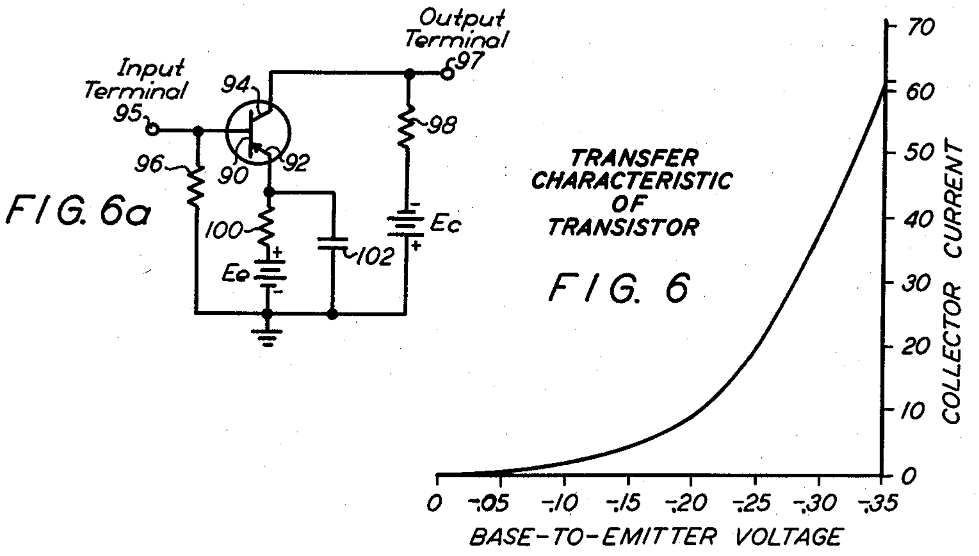

Other objects, features and advantages of the various embodiments of the invention and the theory of operation will become apparent by reading the following detailed description which is accompanied by drawings wherein:

Figure 1 is a block diagram of an automatic gain controlled amplifier system including a schematic circuit diagram of an automatic gain controlled circuit, in accordance with one embodiment of the invention, Figure 2 is a graph showing the input-output characteristic of the automatic gain controlled amplifier system shown in Figure 1, Figures 3 and 3*a* show a schematic circuit of a typical vacuum tube triode amplifier (Figure 3*a*) and a graph representing its grid voltage-anode current characteristic (Fig. 3) which are used to explain the theory of operation of the vacuum tube embodiments of the invention, Figure 4 is a graph showing the grid voltage-anode current curves of the two triode sections of the automatic gain controlled circuit shown in Figure 1, illustrating how the effects of the grid voltage-anode current characteristics are cancelled irrespective of the gain of the amplifier system, Figure 5 is a block diagram of an automatic gain controlled amplifier system including a schematic circuit diagram of an autoamtic gain controlled circuit employing transistors, and Figures 6 and 6*a* shown a graph showing the base-to-emitter-collector current characteristic (Fig. 6) of a typical transistor amplifier circuit (F ig. 6*a*).

*Introduction*

Referring to Figure 1, an amplifier system with automatic gain control is shown in accordance with one embodiment of the invetnion generally comprising an amplifier chain, an automatic gain control voltage system, and an automatic gain controlled circuit. The graph shown in Figure 2 illustrates how the amplitude of the output signal of the amplifier system is substantially constant for wide variations in level of the input signal. The amplifier system shown in Figure 1 employs vacuum tube techniques.

Figure 5 illustrates an amplifier system with automatic gain control employing transistor techniques in accordance with another embodiment of the invention. The amplifier system of Figure 5 generally comprises a transistor amplifier chain, a transistor automatic gain control voltage system, and an automatic gain controlled circuit employing two three-electrode transistors. The performance of the amplifier system of Figure 5 is substantially similar to that of the amplifier system of Figure 1 as illustrated in the graph of Figure 2 except that the voltage levels are substantially smaller.

The theory and the circuitry of an embodiment of the invention employing vacuum tube techniques (Fig. 1) will first be discussed in detail. Thereafter, the theory of operation and circuitry of an embodiment of the invention employing transistor techniques (Fig. 5) will be described in detail.

*Theory of operation (Figs. 1–4)*

A vacuum tube triode is a multi-element device consisting of three elements as shown in Figure 3*a*: a cathode 10, an anode 12 and a grid 14 which is the control element. The cathode 10 is heated by the cathode voltage source 16 and emits electrons which form a negative charge (space charge) in the region of the cathode 10 which reduces further emission of electrons. The anode 12 is connected to a positive anode voltage source 18 via the load resistor 22 so that electrons will flow from the region of the cathode 10 to the anode 12 which is more positive. If the grid 14 positioned between the anode 12 and cathode 10 is made positive with respect to the cathode 10 by the grid voltage source 20, it will tend to neutralize the space charge and thus allow an increase in electron current flow from the cathode 10 to the anode 12. If the grid 14 is negative with respect to the cathode 10 (as is shown), it will reduce the current flow. A decrease in current flowing through the load resistor 22 causes a decrease in voltage drop across the load resistor 22 and therefore a corresponding increase in the voltage of the anode 12.

Thus, a decrease in the voltage of the grid 14 and the consequent decrease in anode-cathode current results in an increase of the voltage of anode 12 and vice versa. Because of the characteristic of the vacuum tube, a small voltage change at the grid 14 produces a much larger voltage change at the anode 12. This increase in voltage change is called voltage gain or amplification.

The graph in Figure 3 represents a characteristic of a typical triode circuit of the type shown in Figure 3*a*. The curve illustrates the anode current for different grid voltages assuming a specific load resistance and anode voltage source. It should be noted that the amount of voltage gain is dependent on the slope of the curve. Thus the steeper the slope the greater the voltage gain. For example, if a 1.0 volt signal is superimposed on the grid 14 when the grid voltage source is set at a potential of —1.5 volts, the grid voltage will swing between —1.0 and —2.0 volts while the anode current will swing between 10 milliamperes and 18 milliamperes, causing the anode voltage to swing between 140 volts and 132 volts, or a total change of 8.0 volts. Thus, there would be a voltage gain of 8. However, if the grid voltage is set at —5.0 volts and the same 1.0 voltage signal is superimposed on the grid 14, the anode current will swing between .5 milliampere and 2.0 milliamperes and the anode voltage will swing from 149.5 volts to 148 volts to produce a total change of 1.5 volts for a voltage gain of 1.5.

Therefore, the amount of voltage gain of the triode amplifier can be controlled by the setting of the grid voltage.

Since the grid voltage-anode current curve is generally not linear, the wave shape of the output signal will not always correspond exactly to the wave shape of the input signal. This is illustrated by the —5.0 grid volt situation where the first half of the cycle of the anode current and therefore the anode voltage swing is of smaller amplitude than the second half of the cycle. In this case, the output signal is substantially distorted.

In accordance with one embodiment of the invention, an automatic gain controlled amplifier system is provided which includes an automatic gain controlled circuit incorporating two triode sections arranged so that distortion caused by one is compensated by opposite distortion caused by the other so that the output is not distorted irrespective of the gain setting of the amplifier. This will be explained in detail in connection with the following detailed description of an automatic gain controlled amplifier system shown in Figure 1.

*Automatic gain controlled vacuum tube amplifier system (Figs. 1–4)*

A signal amplifier system with automatic gain control in accordance with one vacuum tube embodiment of the invention is shown in Figure 1. The signal amplifier system includes the automatic gain controlled circuit 30 which feeds an amplifier chain 31 comprising a series of cascaded vacuum tube amplifiers. The output of the amplifier chain 31 appears at the output signal terminal 33. The automatic gain control voltage system 35 functions in response to the amplitude of the output signal of the amplifier chain 31 to produce an automatic gain control or bias voltage which is fed to the gain control voltage terminal 60 of the automatic gain controlled circuit 30 to provide an amplifying system with automatic gain control.

The amplifier chain 31, when used for video signals, performs various functions such as blanking-mixing and Gamma correction in accordance with well-known techniques.

The automatic gain control voltage system 35 comprises the A.G.C. amplifier 37, the D.C. restorer 39 and the A.G.C. rectifier 41 in series relationship in that order. The output signal at the output of the amplifier chain 31 is fed to the A.G.C. amplifier 37 which is a high gain amplifier. The amplified signal is then D.C. restored by the D.C. restorer 39 so that duty cycle variations do not affect the output of the A.G.C. rectifier 41. The A.G.C. rectifier 41 rectifies and filters the amplied and D.C. restored signal to provide a varying D.C. gain control voltage which is fed to the gain control voltage terminal 60 of the automatic gain controlled circuit 30.

The curve of Figure 2 shows the input-output characteristic of the automatic gain controlled amplifier system shown in Figure 1. The degree of "flatness' between B and C is a function of gain of the automatic gain control voltage system 35. That is the reason why the A.G.C. amplifier 37 is a high-gain amplifier.

The amplifier chain 31, A.G.C. amplifier 37, D.C. restorer 39 and A.G.C. rectifier 41 shown in block diagram form are well known to those skilled in the art and therefore the circuits are not shown in detail. However, the circuitry and operation of the automatic gain controlled circuit 30 will be described in detail.

The automatic gain controlled circuit 30 comprises the cathode coupled triode sections 34 and 36 arranged so that in response to an input signal the respective anode currents change in opposite directions with the effect of cancelling the curvature of the grid voltage-anode current characteristic of one with the opposite curvature of the other.

The triode section 34 comprises the anode 38, the control grid 40, the cathode 42 and the filament 44. The triode section 36 comprises the anode 46, the control grid 48, the cathode 50, and the filament 52. The triode sections 34 and 36 are shown in one envelope but may be separate triode vacuum tubes.

The automatic gain controlled circuit 30 is provided with the anode voltage source B+, the filament voltage source A, and ground which acts as a reference potential source. The automatic gain controlled amplifier system is usually associated with a power supply which provides the necessary voltage or potential sources which are permanently coupled to the associated elements as is illustrated in Figure 1.

The anode 38 is coupled directly to the anode voltage source B+, while the anode 46 is coupled to the anode voltage source B+ via the load resistor 56 and the choke 58 in series relation in that order. The filament voltage source A is connected in series with the filaments 44 and 52 which operate to heat the respective cathodes 42 and 50. The filament voltage source A may be an A.C. source employing a filament transformer or any suitable D.C. source.

An input signal terminal 66 is coupled to the grid 40 via the coupling capacitor 65. The resistor 63 is connected between the input signal terminal 66 and ground to provide the proper termination impedance for the transmission line (not shown) which feeds the input signal to the system. The output signal terminal 67 is connected directly to the anode 46. The cathodes 42 and 50 are connected together and then coupled to ground via the cathode resistor 70.

The grid 40 is coupled to the gain control voltage terminal 60 via the grid resistor 62. The grid 48 is connected to the gain control voltage terminal 60 by means of the grid resistor 64. A bypass capacitor 72 is connected between the grid 48 and ground and provides a low impedance path to ground for the signal. The grid resistors 62 and 64 are chosen to have the same resistance and the capacitors 65 and 72 are chosen to have the same capacitance. Thus, the gain control voltage (at the gain control voltage 60), which is fed to the grids 40 and 48 via the grid resistors 62 and 64 respectively, is fed to circuits having the same time constant. This feature of the invention is particularly important when the voltage level of the input signal varies rapidly. Capacitor 65-resistor 62 and capacitor 72-resistor 64 act as low-pass filters to help smooth out low-frequency video components from the A.G.C. rectifier 41.

The grid resistors 62 and 64 together with the automatic gain control voltage system 35 comprise automatic gain control means.

The operation of the automatic gain controlled circuit 30 of Figure 1 will be described in conjunction with the grid voltage-anode current curve (Fig. 3) of a typical triode. It will first be assumed that the automatic gain control voltage system 35 feeds a gain control voltage of —5.0 volts to the gain control voltage terminal 60. Assume that a sine wave input signal S1 (Figs. 1 and 3) having a voltage amplitude of 1.0 volt is fed to the input signal terminal 66 to be amplified by the automatic gain controlled circuit 30. As the signal swings positive, the anode-cathode current of triode section 34 flowing through the cathode resistor 70 increases. This produces a signal at the cathode 42 shown as signal S2 which is similar in shape to signal S2′ (Fig. 3), except that it is in the same phase as the input signal S1. Thus, the signal at the cathode resistor 70 is distorted since it is operating at a point on the anode current-grid voltage curve which is nonlinear.

The distorted signal S2 appears at the cathode 50 of the triode section 36 since the cathode 50 is connected directly to the cathode 42. The signal at the cathode 50 operates to change the voltage difference between grid 48 and cathode 50 in the same way as if the signal were fed directly to the grid 48 with the following exception: when the signal at the cathode 50 goes positive, it has the same effect as a corresponding negative signal at the grid 48; that is, in both cases the grid of cathode voltage is reduced, resulting in a decrease in the anode-cathode current of the triode section 36. Therefore, the triode section 36 responds to the appearance of signal S2 at its cathode 50 by producing a change in anode current at a rate which is opposite to the rate of change of the anode current of triode section 34; that is, the wave form of the anode current of triode section 36 is the same shape as the wave form of the anode current of triode section 34 but of opposite polarity. This is illustrated in greater detail by the curves shown in Figure 4. As signal S1 swings positive from S1*a* to S1*b*, the anode-cathode current of triode section 34 increases from S1′*a* to S1′*b* and the cathode voltage increases correspondingly (see S2 of Fig. 1). The effect is the same as if the grid voltage of the triode section 36 decreased from S2′*a* to S2′*b*. This produces a decrease in anode-cathode current of triode section 36 from S3′*a* to S3′*b* and a corresponding increase in anode voltage (see S3 of Fig. 1).

The operation is the same when the input signal S1 swings from S1*b* to S1*c* and back to S1*a*.

The final result is that the output signal S3 (Fig. 1) is substantially the same shape as the input signal S1, except that it is of larger amplitude. This is because the distortion due to the curvature of the grid voltage-anode current characteristics of triode section 34 is compensated by the distortion produced by the opposite curvature of the grid voltage-anode current characteristics of triode section 36.

Therefore, distortion produced by the nonlinear grid voltage-anode current characteristic of triode section 34 is compensated by a similar nonlinearity of the grid voltage-anode current characteristic of triode section 36 which is in an opposite direction. This is especially true because over any small portion of the curve, the curvature will be similar on either side of a given point corresponding to a given grid voltage level.

In summary, distortion of the input signal S1 produced by the triode section 34 is compensated for by opposite distortion produced by the triode section 36 so that the net result is the appearance of an amplified signal S3 at the output signal terminal 67 which is substantially the same shape as the input signal S1 at the input signal terminal 62.

Therefore, by controlling the voltage at the gain control voltage terminal 60, the automatic gain controlled circuit 30 provides amplification over a relatively large range of gain without any substantial distortion.

This operation can be illustrated theoretically as follows: the gain equation of a single pentode is:

$$A \cong G_M \times R_L$$

where A is the amplification or voltage gain, $G_M$ is the mutual conductance (which is the ratio of the anode current change to grid voltage change at a given grid voltage), and $R_L$ is the resistance of the anode load resistor. The differential gain is in direct proportion to the $G_M$ change.

To a close approximation the gain equation of the automatic gain controlled circuit 30 shown in Figure 1 is:

$$A \cong \frac{G_{M1} \times R_L}{1 + \frac{G_{M1}}{G_{M2}}}$$

where $G_{M1}$ and $G_{M2}$ are the mutual conductances of triode sections 34 and 36 respectively at a given grid voltage. Since $G_{M2}$ will increase when $G_{M1}$ decreases, a large amount of compensation obtains.

In order to illustrate the surprising results achieved in reducing distortion, the following experiment was made.

Using a single 6CF6 pentode in accordance with a typical prior art automatic gain controlled circuit and an input video signal of 1.0 volt, when the gain was changed by 50%, about 40% differential gain distortion was introduced. Using the automatic gain controlled circuit 30 and an input video signal having a 2.0 volt level, the differential gain distortion was in the order of 1.0%. It should be noted that the larger the input signal generally the greater the percentage of distortion so that the automatic gain controlled circuit 30 produces one-fortieth of the distortion of the prior art circuit using an input signal of twice the voltage level. Therefore, with input signals of the same voltage level, the reduction in distortion is even greater.

When the automatic gain controlled sgnial amplifier system of Figure 1 is used in television broadcasting, the video input signal may be taken from the pre-amplifier in the pickup device. If this is a scanner system, the peak to peak voltage level may vary from 0.1 volt to 1.0 volt.

The automatic gain control signal amplifier system of Figure 1 may be used to amplify color television signals.

In this case three separate automatic gain controlled circuits 30 and amplifier chains 31 are provided one for each primary color, and a single automatic gain control voltage system 35 feeds a gain control voltage to each of the gain control voltage terminals 60 of the respective automatic gain controlled circuits 30. In this system, the automatic gain controlled circuit 30 provides an additional advantage. Since the cathode resistor 70 (Fig. 1) can be relatively large, there is a large amount of degeneration to the automatic gain control voltage and therefore it is easier to make random vacuum tubes "track."

The following values have been found suitable in practice for the various circuit components and potentials described in connection with the automatic gain controlled circuit 30 shown in Figure 1. However, it should be understood that they are given merely as an illustration and that other values may be substituted therefor as may be necessary or desirable.

| | |
|---|---|
| Triode sections 35 and 36 ______________ | Tube 6BK7A |
| Capacitors 65 and 72 ________________μfd__ | 0.1 |
| Resistors 62 and 64 _______________ohms__ | 680,000 |
| Resistor 63 _________________________do____ | 73 |
| Resistor 56 _______________________do____ | 1000 |
| Resistor 70 _______________________do____ | 1500 |
| Choke 58 __________________microhenries__ | 20 |
| Anode voltage source (B+) _________volts__ | 150 |

*Theory of operation (Figs. 5–6)*

As indicated above, the electron tube operates by the flow of electrons between elements in a vacuum. The transistor functions by the flow of electrons and holes within a particular kind of solid. These solids are neither good conductors nor good insulators, but under certain conditions they can be made to show some of the properties of either and then are known as semiconductors. Germanium, silicon and selenium are examples of semiconductors. By adding certain substances or "impurities" to a semiconductor, it can be made to have an excess or a deficiency of electrons. If there is an excess of electrons, the material is called "n-type" since electrons are negative charges. If there is a deficiency of electrons, the material is called "p-type" for the positively charged holes or spaces corresponding to the absence of the electrons from the normal molecular bond structure of a semi-conductor.

The three elements of a transistor are the base, collector and emitter which may be a control element. These can be compared in a general way to the grid, anode and cathode of a vacuum tube. Figure 6*a* shows a typical grounded emitter amplifier circuit (employing a P–N–P junction transistor) which resembles the grounded-cathode vacuum tube circuit shown in Figure 3*a*. The transistor shown in Figure 6*a* comprises the base 90, the emitter 92 and the collector 94. An input signal fed to the input terminal 95 is applied between the base 90 and the emitter 92 and the output signal appears between the collector 94 and emitter 92 at the output terminal 97. A resistor 96 connects the base 90 to ground and a resistor 98 and collector voltage source $E_c$ in series relation couple the collector 94 to ground. The emitter 92 is coupled to ground via the resistor 100 and the emitter voltage source $E_e$. The capacitor 102 by-passes the emitter 92 to ground. The resistors 96 and 98 are chosen to give the proper operating currents to the base 90 and collector 94 respectively. The resistor 100 provides a self-biasing effect similar to a cathode resistor in a cathode circuit.

When a negative signal is impressed between the base 90 and the emitter 92, the emitter-to-base current is increased causing a corresponding increase in the emitter-to-collector current. The ratio of the emitter-base current change to the emitter-collector current change is called the current gain (beta) which corresponds to the voltage gain or amplification factor $\mu$ in vacuum tubes.

One of the differences between a vacuum tube and a transistor is that a vacuum tube is voltage controlled, while a transistor may be considered as current controlled. A difference between the grounded-cathode vacuum tube amplifier and the grounded-emitter transistor amplifier is that the output signal of the vacuum tube amplifier is out-of-phase with the input signal whereas in the transistor amplifier the input signal currents and output signal currents are in phase.

The graph in Figure 6 shows the transfer characteristic of a typical P–N–P junction transistor. It should be noted that as the base-to-emitter voltage becomes more negative, the emiter-base current increases and the emitter-collector current increases so that the collector voltage increases. This shows that the output signal is 180° out-of-phase with the input signal. Moreover, the curve of the base-to-emitter voltage collector current (i.e., the curve of the transfer charcteristic) is curved rather than straight. In this respect the transistor is similar to some vacuum tubes as described above. Therefore, the gain of the transistor amplifier will vary depending on the setting of the base-to-emitter voltage in the same way that the gain of a vacuum tube amplifier varies. Further, the nonlinear curve introduces distortion in the same manner as a nonlinear characteristic curve of a vacuum tube.

The principle of the invention which permits the construction of an automatic gain controlled vacuum tube amplifier system with substantially no distortion is equally applicable to the design of an automatic gain controlled transistor in accordance with other embodiments of the invention.

*Automatic gain controlled transistor amplifier system (Figs. 5 and 6)*

An automatic gain controlled transistor amplifier system in accordance with one embodiment of the invention is shown in Figure 5. The amplifier system comprises the automatic gain controlled circuit 30′, the transistor amplifier chain 31′ and the automatic gain controlled voltage system 35′. The amplifier system is generally similar in construction and operation to the amplifier system shown in Figure 1 with corresponding parts indicated by the same reference number but with a prime designation added. However, the transistor amplifier chain 31′ comprises a series of transistor amplifiers in cascade and the automatic gain control voltage system 35′ also employs transistor circuitry. The transistor amplifier chain 31′ and the transistor automatic gain control voltage system 35′ are shown in block diagram form since they are well known to those skilled in the art. Further, they function in the amplifier system in the same manner to that described in detail above in connection with the amplifier as shown in Figure 1.

The automatic gain controlled circuit 30′ employs two emitter coupled transistor amplifiers arranged so that the distortion introduced by the curved transfer characteristic of one transistor is compensated by opposite distortion produced by opposite curvature of the transfer characteristic of the second transistor.

The automatic gain controlled circuit 30′ comprises the transistors 104 and 106 and associated circuitry. The transistor 104 comprises the base 108, the emitter 110 and the collector 112. The transistor 106 comprises the base 114, the emitter 116 and the collector 118. The emitters 110 and 116 are connected together and coupled to ground via the resistor 120. The input signal terminal 66′ is coupled to the base 108 via the capacitor 122. The resistor 124 connects the input signal terminal 66′ to ground. The collector voltage source $E_c$ is connected directly to the collector 112 and via the resistor 126 to the collector 118. The output signal terminal 67′ is connected to the collector 118. The base 114 is bypassed to ground via the capacitor 128. The bases 108 and 114 are connected via the resistors 130 and 132 respectively to the gain control voltage terminal 60'. The resistors 130 and 132 are chosen to have the same resistance.

The components identified by the same reference characters as corresponding reference characters in the automatic gain controlled circuit 30 (Fig. 1), but with prime designations added, function in a similar manner. Thus, an input signal appearing at the input signal terminal 66' is amplified by the emitter-coupled transistors 104 and 106 without any substantial distortion. The amplified signal appears at the output signal terminal 67' and is fed to and amplified by the transistor amplifier chain 31' to appear at the output signal terminal 33'. The transistor automatic gain control voltage system 35', in response to variations in the level of the signal at the output signal terminal 33', produces a D.C. gain control voltage which is fed to the gain control voltage terminal 60'.

The gain of the automatic gain controlled circuit 30' is controlled in a manner similar to that of the automatic gain controlled circuit 30 (Fig. 1) so that distortion produced by the transistor 104 is compensated by opposite distortion produced by the transistor 106 in a manner similar to that illustrated by the curves shown in Figure 4 except that there is no change of phase.

Thus, the input-output characteristic of the amplifier system of Figure 5 is substantially the same as that shown in Figure 2 except that the voltage levels are lower. Further, the advantages of the amplifier system shown in Figure 1 are equally applicable to the amplifier system shown in Figure 5.

The following values have been found suitable in practice for the various circuit components and potentials described in connection with the automatic gain controlled circuit 30' shown in Figure 5. However, it should be understood that they are given merely as an illusration and that other values may be substituted therefor as may be desirable or necessary.

| | | |
|---|---|---|
| Transistors **104** and **106** | | 2N270 |
| Capacitors **122** and **128** | mf | 50 |
| Resistors **130** and **132** | ohms | 1000 |
| Resistor **124** | do | 75 |
| Resistor **126** | do | 1000 |
| Resistor **120** | do | 100 |
| Collector voltage source $E_c$ | volts | −10 |

*Conclusion*

Therefore, in accordance with the invention, improved vacuum tube and transitor automatic gain controlled amplifier sytems have been provided which amplify signals with substantially no amplitude distortion. The amplifier systems are particularly useful in television broadcasting, whether black and white or color, and are especially useful when a film is the source of the video signals since the amplifier systems respond to relatively large and rapid variations in video signal levels.

While only a few embodiments of the invention have been described in detail, it should be apparent that many modifications and changes may readily be made without departing from the spirit and scope of the invention.

What is claimed is:

1. A signal amplifier system adapted for use with a voltage source comprising first and second multi-element devices each having a first element, a second element and a control element, a first resistor, the first element of said first multi-element device being adapted to be coupled to one terminal of the voltage source, the first element of said second multi-element device being adapted to be coupled to said one terminal of the voltage source via said first resistor, a second resistor, said second elements being coupled together and adapted to be coupled to the other terminal of the voltage source via said second resistor, automatic gain control means coupled to each of said control elements to vary the gain of each of said first and second multi-element devices equally and automatically, and a signal bypass capacitor, the control element of said second multi-element device being adapted to be coupled to the other terminal of the voltage source via said signal bypass capacitor, the control element of said first multi-element device being responsive to a signal to produce a change in first element-second element current in said first multi-element device and a corresponding change in second element voltage, the corresponding change in second element voltage producing a corresponding change in first element-second element current of said second multi-element device but in a direction opposite to the direction of change of the first element-second element current in said first multi-element device.

2. A signal amplifier system adapted for use with an anode voltage source comprising first and second triode sections each having an anode, a cathode and said first and second triode sections having substantially the same grid voltage-anode current characteristic, a grid, a load resistor, the anode of said first triode section being adapted to be coupled to one terminal of the anode voltage source, the anode of said second triode section being adapted to be coupled to said one terminal of the anode voltage source via said load resistor, a cathode resistor, said cathodes being coupled together and adapted to be coupled to the other terminal of said anode voltage source via said cathode resistor, automatic gain control means responsive to signals developed across said load resistor for feeding the same gain control voltage to each of the grids to vary the gain of each of said first and second triode sections equally and automatically, and a signal bypass capacitor, the grid of said second triode section being adapted to be coupled to the other terminal of the anode voltage source via said signal bypass capacitor, the grid of said first triode section being responsive to a signal to produce a change in anode-cathode current in said first triode section and a corresponding change in cathode voltage, the corresponding change in cathode voltage producing a corresponding change in anode-cathode current of said second triode section but in a direction opposite to the direction of change of the anode-cathode current in said first section.

3. A signal amplifier system adapted for use with a collector voltage source comprising first and second transistors each having a collector, an emitter and a base, said first and second transistors having substantially the same transfer characteristic, a load resistor, the collector of said first transistor being adapted to be coupled to one terminal of the collector voltage source, the collector of said second transistor being adapted to be coupled to said one terminal of the collector voltage source via said load resistor, an emitter resistor, said emitters being coupled together and adapted to be coupled to the other terminal of said collector voltage source via said emitter resistor, automatic gain control means responsive to signals developed across said load resistor for feeding the same gain control voltage to each of the bases to vary the gain of each of said first and second transistors equally and automatically, and a signal bypass capacitor, the base of said second transistor being adapted to be coupled to said other terminal of the collector voltage source via said signal bypass capacitor, the base of said first transistor being responsive to the signal to produce a change in collector-emitter current in said first transistor and a corresponding change in emitter voltage, the corresponding change in emitter voltage producing a corresponding change in collector-emitter current of said second transistor but in a direction opposite to the direction of change of the collector-emitter current in said first transistor.

4. The signal amplifier system of claim 1 wherein said automatic gain control means comprises third and fourth resistors and an automatic gain control voltage system coupled to the control elements of said first and second multi-element devices via said third and fourth resistors respectively.

5. The signal amplifier system of claim 4 wherein said third and fourth resistors are of equal resistance.

6. The signal amplifier system of claim 4 including an input capacitor coupled to the control element of said first multi-element device.

7. The signal amplifier system of claim 6 wherein said third and fourth resistors are chosen to have the same resistance, said input and bypass capacitors are chosen to have the same capacitance, said input capacitor and said third resistor are chosen to comprise a low pass filter and said bypass capacitor and said fourth resistor are chosen to comprise a low pass filter.

8. A signal amplifier system comprising an automatic gain controlled circuit having an input terminal and a gain control voltage terminal and an automatic gain control voltage system coupled to the gain control voltage terminal of said automatic gain controlled circuit; said automatic gain controlled circuit comprising first and second multi-element devices each having first and second elements and a control element, means coupling the control element of said first multi-element device to said input terminal, the second elements of said first and second multi-element devices being coupled together so that said second multi-element device is responsive to said first multi-element device, means coupled between said gain control voltage terminal and both of said control elements for maintaining said control elements at substantially the same potential and each of said first and second multi-element devices at substantially the same gain, means for establishing operating potentials on each of said first and second elements, and means for coupling said signal amplifier system in circuit relation, said first and second multi-element devices being chosen to have substantially the same nonlinear characteristic so that the control element of said first multi-element device is responsive to a signal at the input terminal of said automatic gain controlled circuit to produce a current change in one direction between the first and second elements of said first multi-element device and a corresponding current change in the opposite direction between the first and second elements of said second multi-element device.

9. The signal amplifier system of claim 8 wherein said means coupled between said gain control voltage terminal and both of said control elements for maintaining said control elements at substantially the same potential nad each of said first and second multi-element devices at substantially the same gain comprise low pass filter means.

10. A signal amplifier system comprising an automatic gain controlled circuit having an input terminal, and a gain control voltage terminal, and an automatic gain control voltage system coupled to the gain control voltage terminal of said automatic gain controlled circuit; said automatic gain controlled circuit comprising first and second multi-element devices each having first and second elements and a control element, means coupling the control element of said first multi-element device to said input terminal, the second elements of said first and second multi-element devices being coupled together so that said second multi-element device is responsive to said first multi-element device, means coupled between said gain control voltage terminal and both of said control elements for maintaining said control elements at substantially the same potential and each of said first and second multi-element devices at substantially the same gain, means adapted to establish operating potentials on each of said first and second elements, and means for coupling said signal amplifier system in circuit relation, said first and second multi-element devices being chosen to have substantially the same nonlinear characteristic so that the control element of said first multi-element device is responsive to a signal at the input terminal of said automatic gain controlled circuit to produce a current change in one direction between the first and second elements of said first multi-element device and a corresponding current change in the opposite direction between the first and second elements of said second multi-element device to cause the signal distortion produced by the nonlinearity of the characteristic of said first multi-element device to be compensated by the signal distortion produced by the corresponding nonlinearity of the characteristic of said second multi-element device.

11. A signal amplifier system comprising an automatic gain controlled circuit having an input terminal, an output terminal and a gain control voltage terminal, an amplifier chain coupled to the output terminal of said automatic gain controlled circuit, and an automatic gain control voltage system coupled from said amplifier chain to the gain control voltage terminal of said automatic gain controlled circuit; said automatic gain controlled circuit comprising first and second multi-element devices each having first and second elements and a control element, means coupling the control element of said first multi-element device to said input terminal, means coupling the first element of said second multi-element device to said output terminal, the second elements of said first and second multi-element devices being coupled together so that said second multi-element device is responsive to said first multi-element device, means coupled between said gain control voltage terminal and both of said control elements for maintaining said control elements at substantially the same potential and each of said first and second multi-element devices at substantially the same gain, means for coupling said signal amplifier system in circuit relation, and means adapted to establish operating potentials on each of said first and second elements, said first and second multi-element devices being chosen to have substantially the same nonlinear characteristic so that the control element of said first multi-element device is responsive to a signal at the input terminal of said automatic gain controlled circuit to produce a current change in one direction between the first and second elements of said first multi-element device and a corresponding current change in the opposite direction between the first and second elements of said second multi-element device to cause the signal distortion produced by the nonlinearity of the characteristic of said first multi-element device to be compensated by the distortion produced by the corresponding nonlinearity of the characteristic of said second multi-element device; said automatic gain control voltage system being responsive to variations in the level of the output signal of said amplifier chain to produce automatically corresponding changes in the potential at the gain control voltage terminal of said automatic gain controlled circuit to control automatically the gain of each of said first and second multi-element devices and thus to prevent relatively large changes in the level of the output signal of said amplifier chain due to relatively large changes in the level of the signal at the input terminal of said automatic gain controlled voltage circuit.

12. The signal amplifier system of claim 10 wherein each of said multi-element devices is a vacuum tube having at least three elements, and each of said first, second and control elements is an anode, a cathode and a control grid respectively.

13. The signal amplifier system of claim 10 wherein each of said multi-element devices is a transistor having at least three elements and each of said first, second and control elements is a collector, an emitter and a base respectively.

14. The signal amplifier system of claim 11 wherein each of said multi-element devices is a vacuum tube having at least three elements, and each of said first, second and control elements is an anode, a cathode and a control grid respectively.

15. The signal amplifier system of claim 11 wherein each of said multi-element devices is a transistor having at least three elements and each of said first, second and control elements is a collector, an emitter and a base respectively.

16. A signal amplifying circuit adapted for use with a voltage source having two terminals comprising first and second triode sections each having an anode, a cathode and a grid, a load resistor, the anode of said first triode section being adapted for connection to one terminal of said voltage source, the anode of said second triode section being adapted for connection to said one terminal of said voltage source via said load resistor, a cathode resistor, said cathodes being coupled together and connectible to the other terminal of said voltage source via said cathode resistor so that said second triode is responsive to said first triode, a capacitor to provide a low impedance path for the signal, the grid of said second triode section being adapted for connection to said other terminal of said voltage source via said capacitor, and automatic gain control means coupled to each of the grids to vary the gain of each of said first and second triode section simultaneously and automatically, the grid of said first triode section being responsive to the signal to produce a change in anode-cathode current in said first triode section and a corresponding change in cathode voltage, the corresponding change in cathode voltage producing a corresponding change in anode-cathode current of said second triode section but in a direction opposite to the direction of change of the anode-cathode current in said first triode section, so that distortion due to the nonlinearity of the grid voltage-anode current characteristic of said first triode section is compensated by the nonlinearity of the grid voltage-anode current characteristic of said second triode section.

17. A signal amplifying system comprising: a voltage source having two terminals; a gain controlled circuit; an amplifier chain coupled to the output of said gain controlled circuit; an automatic gain control voltage system coupled from the output of said amplifier chain to said gain controlled circuit, said automatic gain control voltage system comprising an automatic gain control amplifier, a D.C. restorer and an automatic gain control rectifier in series relation; said gain controlled circuit comprising first and second triode sections each having an anode, a cathode and a grid, a load resistor, the anode of said first triode section being coupled to one terminal of said voltage source, the anode of said second triode section being coupled to said one terminal of said voltage source via said load resistor, a cathode resistor, said cathodes being coupled together and coupled to the other terminal of said voltage source via said cathode resistor, a capacitor to provide a low impedance path for the signal, the grid of said second triode section being coupled to said other terminal of said voltage source via said capacitor, first and second grid resistors, the output of said automatic gain control voltage system being coupled to the grids of said first and second triode sections by said first and second grid resistors respectively; the grid of said first triode being responsive to a signal to produce a change in anode-cathode current in said first triode section and a corresponding change in cathode voltage, the corresponding change in cathode voltage producing a corresponding change in anode-cathode current of said second triode section but in a direction opposite to the direction of change of the anode-cathode current in said first triode section, so that distortion due to the nonlinearity of the grid voltage-anode current characteristic of said first triode section is compensated by a corresponding nonlinearity of the grid voltage-anode current characteristic of said second triode section, the amplified signal at the anode of said second triode section being of substantially the same wave shape as the signal at the grid of said first triode section at different values of gain determined by said automatic gain control voltage system.

18. A signal amplifier system comprising an automatic gain control circuit, a source of operating potential, first and second multi-element signal devices, each of said multi-element signal devices having a control element, a controlled element and a reference element, means for coupling said controlled elements to one terminal of said source of operating potential, means for coupling said reference elements to the other terminal of said source of operating potential, means for developing a signal on the reference element of said first multi-element signal device in response to a signal received at the control element of said first multi-element signal device, means for maintaining the control element of said second multi-element signal device at a substantially constant signal potential, the reference element of said second multi-element signal device being responsive to the signal developed on the reference element of said first multi-element signal device, means for developing a signal on the controlled element of said second multi-element signal device in response to the signal developed on the reference element of said second multi-element signal device, said automatic gain control circuit being responsive to the signal developed at the controlled element of said second multi-element signal device for developing a control voltage, and means for feeding said control voltage to each of said control elements.

19. The signal amplifier system of claim 18 wherein each of said multi-element signal devices is a vacuum tube having a control grid which is the control element, an anode which is the controlled element, and a cathode which is the reference element.

20. The signal amplifier system of claim 18 wherein each of said multi-element signal devices is a transistor having a base which is the control element, a collector which is the controlled element, and an emitter which is the reference element.

References Cited in the file of this patent

UNITED STATES PATENTS

| | | |
|---|---|---|
| 2,162,878 | Brailsford | June 20, 1939 |
| 2,245,353 | Morlock | June 10, 1941 |
| 2,284,102 | Rosencrans | May 26, 1942 |
| 2,750,451 | Crow | June 12, 1956 |
| 2,774,866 | Burger | Dec. 18, 1956 |

FOREIGN PATENTS

| | | |
|---|---|---|
| 437,640 | Italy | July 9, 1948 |